(12) United States Patent
Tobin et al.

(10) Patent No.: US 10,100,805 B2
(45) Date of Patent: Oct. 16, 2018

(54) TIP EXTENSION ASSEMBLY FOR A WIND TURBINE ROTOR BLADE

(71) Applicant: General Electric Company, Schenectady, NY (US)

(72) Inventors: James Robert Tobin, Simpsonville, SC (US); William Max Gobeli, Simpsonville, SC (US); Stefan Herr, Greenville, SC (US)

(73) Assignee: General Electric Compant, Schenectady, NY (US)

( * ) Notice: Subject to any disclaimer, the term of this patent is extended or adjusted under 35 U.S.C. 154(b) by 310 days.

(21) Appl. No.: 14/880,346

(22) Filed: Oct. 12, 2015

(65) Prior Publication Data

US 2017/0101979 A1 Apr. 13, 2017

(51) Int. Cl.
 *F03D 1/06* (2006.01)
(52) U.S. Cl.
 CPC ......... *F03D 1/0658* (2013.01); *F03D 1/0675* (2013.01); *F05B 2230/80* (2013.01); *F05B 2260/96* (2013.01)
(58) Field of Classification Search
 CPC ... Y02E 10/721; F03D 1/0658; F03D 1/0675; F03D 1/0683; F03D 1/065; F03D 1/0633; F03D 1/0641; F03D 13/10; F05B 2260/96; F05B 2260/962; F05B 2260/964; F05B 2240/30; F05B 2240/302; F05B 2240/301; F05B 2240/311; F05B 2240/313; F05B 2300/80; F05B 2300/23; F05B 2300/50; F05B 2230/80; Y10T 156/103; Y10T 29/49318; Y02T 50/166; B64C 2230/14
 See application file for complete search history.

(56) References Cited

U.S. PATENT DOCUMENTS

| RE19,412 E | 1/1935 | Zaparka |
| 2,450,440 A | 10/1948 | Mills |
| 2,457,889 A * | 1/1949 | Gruetjen ................ B23P 15/04 |
| | | 219/100 |
| 3,137,887 A | 6/1964 | Manning et al. |
| 3,528,753 A | 9/1970 | Dutton et al. |

(Continued)

FOREIGN PATENT DOCUMENTS

| WO | WO 2012/076168 A2 | 6/2012 |
| WO | WO 2013/023745 A1 | 2/2013 |

OTHER PUBLICATIONS

Co-pending U.S. Appl. No. 14/706,024, filed May 7, 2015.

*Primary Examiner* — Justin Seabe
*Assistant Examiner* — Joshua R Beebe
(74) *Attorney, Agent, or Firm* — Dority & Manning, P.A.

(57) ABSTRACT

The present disclosure is directed to a tip extension assembly for a rotor blade of a wind turbine. The tip extension assembly includes a tip extension having a body with a pressure side surface and a suction side surface. Further, the tip extension is slidable onto a tip of the rotor blade so as to overlap the rotor blade adjacent the tip. In addition, the tip extension defines an extended trailing edge of the rotor blade. Moreover, an edge of the tip extension defines a step profile at a transition region between the tip extension and a trailing edge of the rotor blade. The tip extension assembly also includes at least one chord extension configured for attachment adjacent to the edge of the tip extension so as to minimize the step profile and associated noise caused thereby.

13 Claims, 8 Drawing Sheets

(56) References Cited

U.S. PATENT DOCUMENTS

| | | | |
|---|---|---|---|
| 3,586,460 A | 6/1971 | Toner | |
| 4,329,119 A | 5/1982 | Baskin | |
| 4,471,925 A * | 9/1984 | Kunz | B64C 7/00 |
| | | | 244/130 |
| 4,626,172 A | 12/1986 | Mouille et al. | |
| 4,878,808 A * | 11/1989 | Wildenauer | F03D 1/065 |
| | | | 416/132 B |
| 5,088,665 A | 2/1992 | Vijgen et al. | |
| 5,320,491 A * | 6/1994 | Coleman | F03D 7/0252 |
| | | | 244/213 |
| 5,346,367 A | 9/1994 | Doolin et al. | |
| 5,518,210 A * | 5/1996 | Friberg | B64C 3/50 |
| | | | 244/198 |
| 6,145,791 A * | 11/2000 | Diller | B64C 3/48 |
| | | | 244/130 |
| 6,890,152 B1 | 5/2005 | Thisted | |
| 7,059,833 B2 | 6/2006 | Stiesdal et al. | |
| 7,458,777 B2 | 12/2008 | Herr | |
| 7,637,721 B2 | 12/2009 | Driver et al. | |
| 7,690,895 B2 * | 4/2010 | Moroz | F03D 1/0633 |
| | | | 416/132 B |
| 7,988,421 B2 | 8/2011 | Bakhuis et al. | |
| 8,083,488 B2 | 12/2011 | Fritz | |
| 8,162,590 B2 | 4/2012 | Haag | |
| 8,376,450 B1 | 2/2013 | Long et al. | |
| 8,678,746 B2 | 3/2014 | Haag | |
| 2003/0223868 A1 * | 12/2003 | Dawson | F03D 7/0236 |
| | | | 416/1 |
| 2007/0065290 A1 | 3/2007 | Herr | |
| 2007/0077150 A1 | 4/2007 | Llorente Gonzalez | |
| 2009/0074585 A1 | 3/2009 | Koegler et al. | |
| 2010/0135806 A1 | 6/2010 | Benito | |
| 2010/0135814 A1 * | 6/2010 | Bakhuis | F03D 1/0633 |
| | | | 416/223 R |
| 2010/0260603 A1 * | 10/2010 | Dawson | F03D 1/0675 |
| | | | 416/87 |
| 2010/0296940 A1 | 11/2010 | Zuteck | |
| 2010/0296941 A1 | 11/2010 | Zuteck | |
| 2011/0076149 A1 | 3/2011 | Santiago et al. | |
| 2011/0097326 A1 | 4/2011 | Luehrsen | |
| 2011/0135467 A1 | 6/2011 | Saddoughi et al. | |
| 2011/0142635 A1 | 6/2011 | Fritz | |
| 2011/0142668 A1 * | 6/2011 | Rao | F03D 1/0675 |
| | | | 416/229 R |
| 2011/0211966 A1 * | 9/2011 | Watts | F03D 1/0633 |
| | | | 416/223 R |
| 2011/0223028 A1 | 9/2011 | Stege et al. | |
| 2011/0243736 A1 * | 10/2011 | Bell | F03D 1/0675 |
| | | | 416/132 R |
| 2011/0268558 A1 | 11/2011 | Driver | |
| 2012/0027590 A1 | 2/2012 | Bonnet | |
| 2012/0121430 A1 | 5/2012 | Olsen et al. | |
| 2012/0141281 A1 * | 6/2012 | Carroll | F03D 1/0641 |
| | | | 416/219 A |
| 2012/0269643 A1 * | 10/2012 | Hibbard | F03D 1/0675 |
| | | | 416/226 |
| 2013/0323070 A1 * | 12/2013 | Grabau | F03D 1/0675 |
| | | | 416/229 R |
| 2014/0072440 A1 * | 3/2014 | Jacobsen | F03D 1/06 |
| | | | 416/241 R |
| 2014/0186175 A1 | 7/2014 | Baehmann et al. | |

* cited by examiner

TIP EXTENSION ASSEMBLY FOR A WIND TURBINE ROTOR BLADE

FIELD OF THE INVENTION

The present disclosure relates in general to wind turbine rotor blades, and more particularly to a tip extension assembly for wind turbine rotor blades.

BACKGROUND OF THE INVENTION

Wind power is considered one of the cleanest, most environmentally friendly energy sources presently available, and wind turbines have gained increased attention in this regard. A modern wind turbine typically includes a tower, generator, gearbox, nacelle, and one or more rotor blades. The rotor blades capture kinetic energy of wind using known foil principles. The rotor blades transmit the kinetic energy in the form of rotational energy so as to turn a shaft coupling the rotor blades to a gearbox, or if a gearbox is not used, directly to the generator. The generator then converts the mechanical energy to electrical energy that may be deployed to a utility grid.

In many cases, accessory components are attached to the rotor blades of wind turbines to perform various functions during operation of the wind turbine. For example, it is known to change the aerodynamic characteristics of wind turbine rotor blades by adding protrusions or other structures to the surface of the blade. Such structures increase the energy conversion efficiency during normal operation of the wind turbine by increasing the lift force of the blades while decreasing the drag force. Example components include winglets, tip extensions, vortex generators, and the like. The purposes and operational principals of these devices are well understood by those skilled in the art.

For example, U.S. patent application Ser. No. 14/706,024 entitled "Attachment Method and System to Install Components, Such as Tip Extensions and Winglets, to a Wind Turbine Blade" filed on May 7, 2015, which is incorporated herein by reference in its entirety, describes a tip extension for a wind turbine rotor blade. The tip extension of the aforementioned patent application has a sock-type configuration that slides onto the blade tip of the rotor blade so as to modify the aerodynamic properties of the blade tip. Once installed, the tip extension can create a chord-wise step at the trailing edge of the inboard tip extension between the tip extension and the rotor blade shell. Such a step can create airflow and/or noise concerns. Thus, the industry would benefit from a tip extension assembly that minimizes negative impacts to the aerodynamic profile of the rotor blade, thereby reducing associated noise.

Accordingly, the present disclosure is directed to a tip extension assembly that includes one or more chord extensions configured adjacent to a sock-type tip extension so as to provide a transition between the aforementioned chord-wise step and the surface of the rotor blade.

BRIEF DESCRIPTION OF THE INVENTION

Aspects and advantages of the invention will be set forth in part in the following description, or may be obvious from the description, or may be learned through practice of the invention In one aspect, the present disclosure is directed to a tip extension assembly for a rotor blade of a wind turbine. The tip extension assembly includes a tip extension having a body with a pressure side surface and a suction side surface. Further, the tip extension is slidable onto a tip of the rotor blade so as to overlap the rotor blade adjacent the tip. In addition, the tip extension defines an extended trailing edge of the rotor blade. Moreover, an edge of the tip extension defines a step profile at a transition region between the tip extension and a trailing edge of the rotor blade. Thus, the tip extension assembly also includes at least one chord extension configured for attachment adjacent to the edge of the tip extension so as to minimize the step profile, e.g. and corresponding noise caused thereby.

In one embodiment, a first end of the chord extension may contact the edge of the tip extension so as to provide a continued extended trailing edge of the rotor blade. For example, in one embodiment, the first end of the chord extension may contact the edge of the tip extension by abutting against the edge of the tip extension. Alternatively, the first end of the chord extension may contact the edge of the tip extension by overlapping the edge of the tip extension.

In another embodiment, the chord extension may taper towards an outer surface of the rotor blade. For example, in certain embodiments, the chord extension may taper towards an outer surface of the rotor blade such that a second end of the chord extension is substantially flush with the outer surface of the rotor blade. In alternative embodiments, the chord extension may taper towards an outer surface of the rotor blade such that a step profile of a second end of the chord extension is reduced by about 50% or more as compared to the step profile of a first end of the chord extension.

In further embodiments, a second end of the chord extension may extend to an inboard location of the rotor blade, wherein the inboard location minimizes the noise generated by the step profile.

In additional embodiments, the chord extension may be arranged with the tip extension such that a gap may exist between a first end of the chord extension and the edge of the tip extension.

In another embodiment, the tip extension assembly may also include a plurality of chord extensions aligned along a span of the rotor blade so as to define a continued extended trailing edge of the rotor blade. For example, in certain embodiments, the plurality of chord extensions may be arranged with a span-wise gap between each of the chord extensions. In alternative embodiments, the plurality of chord extensions may be arranged such that adjacent chord extensions contact each other.

In further embodiments, at least one of the chord extensions may include an aerodynamic feature, such as a serrated edge.

In yet another embodiment, the chord extension may include at least one of a pressure side surface or a suction side surface. More specifically, in certain embodiments, the chord extension may include both a pressure side surface and a suction side surface mounted to the pressure and suction sides of the rotor blade, respectively.

In another aspect, the present disclosure is directed to a chord extension assembly for a rotor blade of a wind turbine configured for use with a sock-type tip extension. The chord extension assembly includes at least one chord extension configured for attachment to the rotor blade adjacent to an edge of the sock-type tip extension so as to minimize a step profile at a transition region between the tip extension and a trailing edge of the rotor blade so as to minimize noise caused by the step profile. It should be understood that the chord extension assembly may further include any of the additional features as described herein.

In yet another aspect, the present disclosure is directed to a rotor blade for a wind turbine. The rotor blade includes a blade root, a blade tip, a pressure side, and a suction side. Further, the pressure and suction sides extend between leading and trailing edges. In addition, the rotor blade also includes a tip extension slid onto and overlapping the blade tip so as to define an extended trailing edge of the rotor blade. The tip extension includes a body having a pressure side surface and a suction side surface. Further, an edge of the tip extension defines a step profile at a transition region between the tip extension and the trailing edge of the rotor blade. Thus, the rotor blade also includes at least one chord extension secured to at least one of the pressure side or the suction side of the rotor blade adjacent to the edge of the tip extension so as to minimize the step profile. It should be understood that the rotor blade may further include any of the additional features as described herein.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
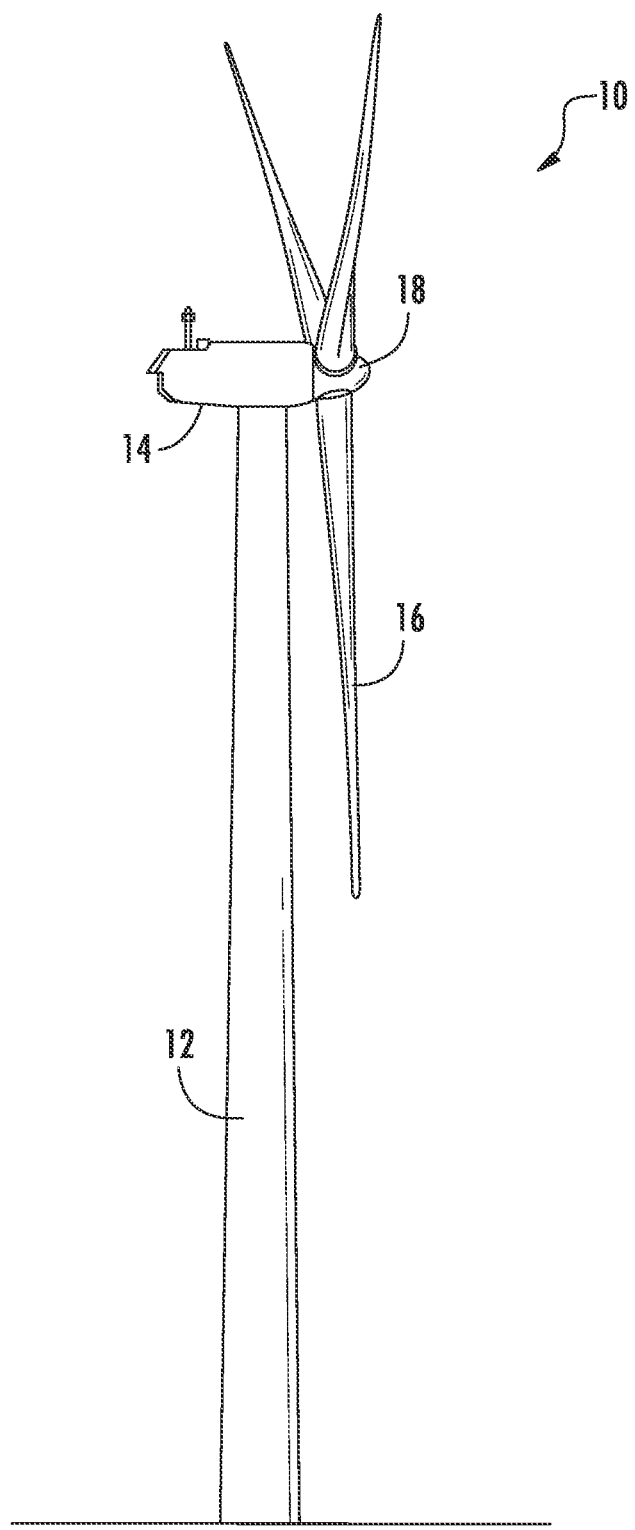
FIG. 1 illustrates a perspective view of a wind turbine in accordance with the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, the present disclosure is directed to a tip extension assembly for a rotor blade. The tip extension assembly includes a sock-type tip extension having a body with a pressure side surface and a suction side surface. Further, the tip extension is slidable onto a tip of the rotor blade so as to overlap the rotor blade adjacent the tip. In addition, the tip extension defines an extended trailing edge of the rotor blade. Moreover, an edge of the tip extension defines a step profile at a transition region between the tip extension and a trailing edge of the rotor blade. Thus, the tip extension assembly also includes at least one chord extension configured for attachment adjacent to the edge of the tip extension so as to minimize noise caused by the step profile.

The present disclosure provides many advantages not present in the prior art. For example, the present disclosure reduces noise associated with the sock-type tip extension and provides additional power generation. More specifically, in certain embodiments, by extending the chord extension transition length inboard a predetermined distance, the tip speed at the transition is lower and therefore less susceptible to noise concerns. In addition, the chord extension length may be reduced as the assembly extends inboard such that step profile is small enough to no longer cause a noise problem.

Referring now to the drawings, FIG. 1 illustrates a wind turbine 10 of conventional construction. As shown, the wind turbine 10 includes a tower 12 with a nacelle 14 mounted thereon. A plurality of blades 16 are mounted to a rotor hub 18, which is in turn connected to a main flange that turns a main rotor shaft. The wind turbine power generation and control components are housed within the nacelle 14. The view of FIG. 1 is provided for illustrative purposes only to place the present invention in an exemplary field of use. It should be appreciated that the invention is not limited to any particular type of wind turbine configuration.

Figure 2:
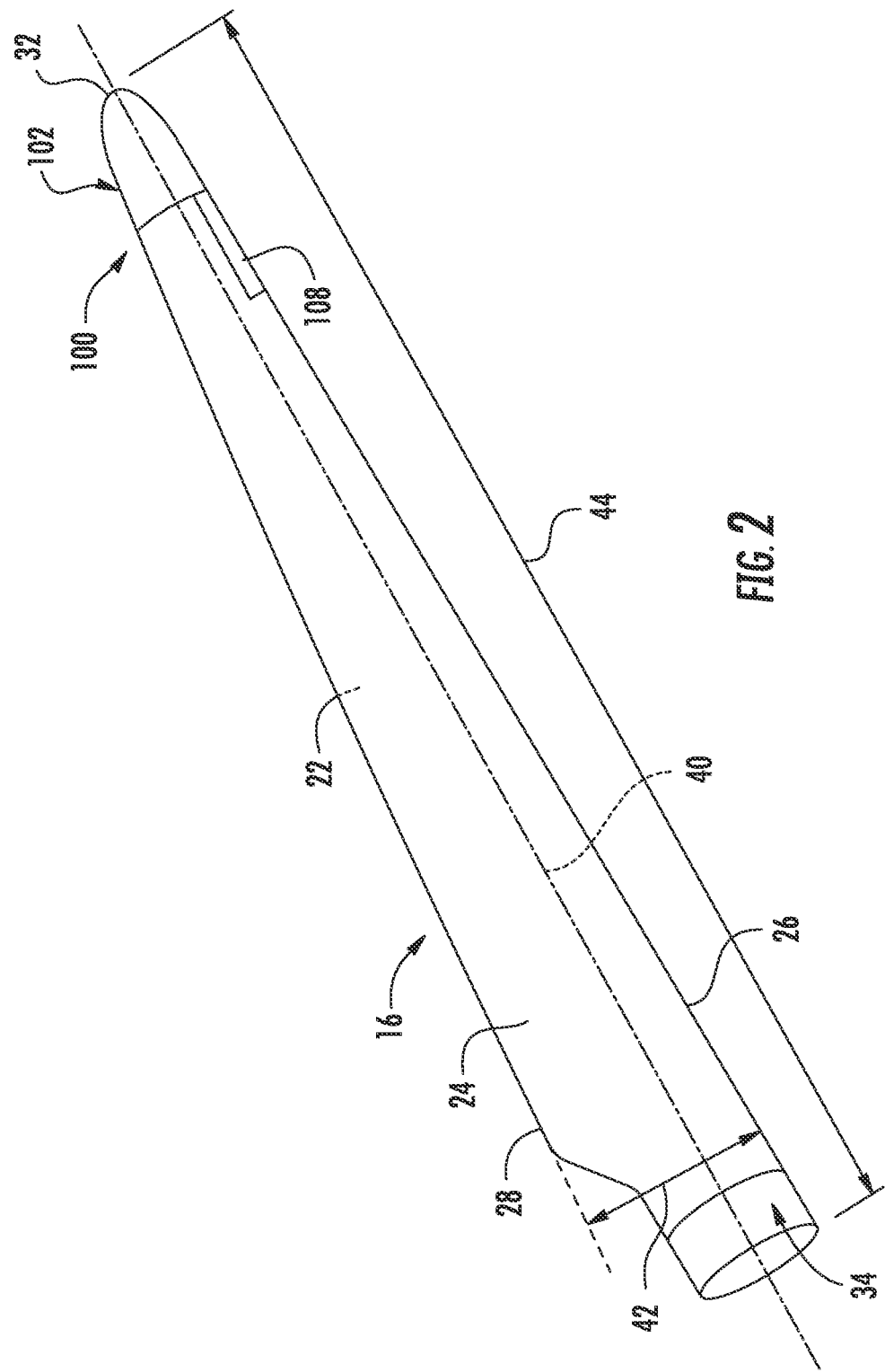
FIG. 2 illustrates a perspective view of one embodiment of a rotor blade of a wind turbine with a tip extension in accordance with the present disclosure.

Referring now to FIG. 2, one embodiment of a rotor blade 16 is illustrated with a tip extension assembly 100 attached to the blade tip 32 in accordance with aspects of the present invention. Further, as shown, the rotor blade 16 has a pressure side 22 and a suction side 24 extending between a leading edge 26 and a trailing edge 28, and extends from a blade root 34 to the blade tip 32. The rotor blade 16 further defines a pitch axis 40 relative to the rotor hub 18 (FIG. 1) that typically extends perpendicularly to the rotor hub 18 and blade root 34 through the center of the blade root 34. A pitch angle or blade pitch of the blade 16, i.e., an angle that determines a perspective of the rotor blade 16 with respect to the air flow past the wind turbine 10, may be defined by rotation of the blade 16 about the pitch axis 40.

In addition, as shown, the rotor blade 16 defines a chord 42 and a span 44. As shown in FIG. 2, the chord 42 may vary throughout the span 44 of the rotor blade 16. Thus, a local chord may be defined for the blade 16 at any point on the blade 16 along the span 44.

Figure 3:
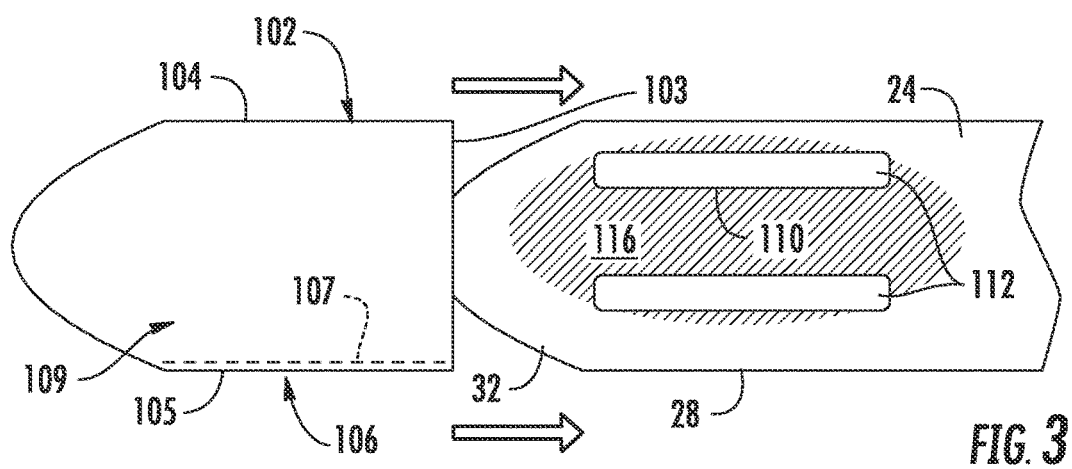
FIG. 3 illustrates a partial top view of one embodiment of a rotor blade of a wind turbine with a tip extension being slid onto the blade in accordance with the present disclosure.

Referring now to FIG. 3, the tip extension 102 has a generally hollow body 109 having a span-wise end 103, a closed leading edge 104, and a separated trailing edge 106. More specifically, the trailing edge 106 is separated in that a suction side edge 105 and a pressure side edge 107 are not bonded or sealed together along at least part of the length of the trailing edge 106, which allows the pressure and suction sides of the tip extension 102 to be pulled apart to an extent necessary to slide the extension 102 onto the blade tip 32. In certain embodiments as generally shown in the figures, the trailing edge 106 is separated along essentially the entire length of the trailing edge, although this is not a requirement for all embodiments.

Although FIG. 3 depicts (by arrows) the tip extension 102 being slid linearly in a span-wise direction onto the blade 16, it should be appreciated that this sliding motion may include a chord-wise direction component that is aided by the separated nature of the trailing edge 106.

Figure 4:
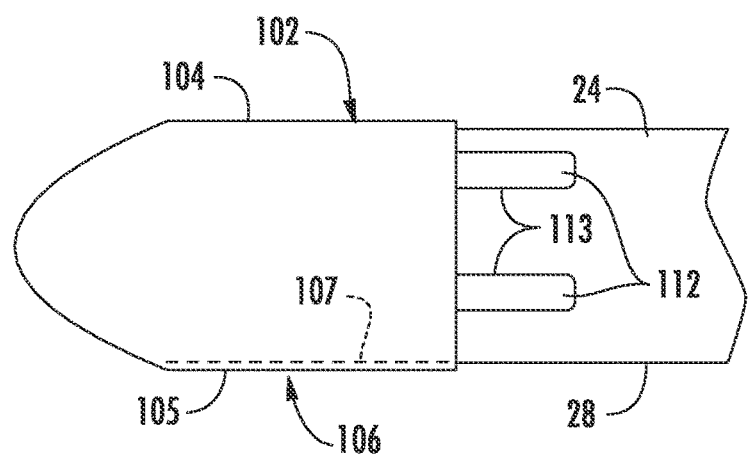
FIG. 4 illustrates a partial top view of the embodiment of FIG. 3 after the tip extension has been slid into position on the wind turbine.

Referring to the embodiment of FIGS. 3 and 4, strips of a double-sided adhesive tape 110 may be adhered in any desired pattern or configuration onto the blade surface 24 (e.g., the suction side surface) adjacent to the blade tip 32. It should be appreciated that a single, larger strip of tape 110 could also be utilized in place of multiple strips. Although not depicted in the figures, the tape strips may also be adhered to the pressure side surface 22. The pattern of the tape strips 110 may be span-wise oriented and spaced-apart, as depicted in FIG. 3. It should be appreciated that the tape strips 110 may be applied to either or both of the blade surfaces 22, 24. The tape strips 110 have a release liner 112 attached to exposed sides of the tape 110 to protect an underlying adhesive layer 111.

In the embodiment of FIG. 3, the tape strips 110 are initially adhered to the blade surface 24, wherein the tip extension 102 is subsequently held or otherwise maintained in the desired position on the blade (e.g., by being pressed against the tape strips 110) for subsequent removal of the release liner 112 from between the underside of the add-on component and the tape 110. It should be appreciated that there may be some degree of inherent "play" or movement of the tip extension 102 at the desired position on the blade as the release liners 112 are removed.

In an alternate embodiment, the tape strips 110 may be applied to an interior surface of the tip extension 102 in the same pattern discussed above, which is then pressed against the blade surface 24, 22 for subsequent removal of the release liner 112 from the opposite side of the tape 110 (as explained more fully below).

FIG. 3 also depicts an additional aspect that may be incorporated into any of the other embodiments described herein. In particular, an adhesive 116 is depicted as underlying the adhesive tape strips 110. In certain embodiments, it may be desired to coat the surface 24 of the blade where the tip extension 102 will be placed with a liquid or paste adhesive (e.g., and epoxy) 116, for example to compensate for any surface irregularities or mismatch between the blade surface and the tip extension 102 due, for example, to machining tolerances, before positioning the tape strips 110 on the blade surface 24. The tape strips 110 and tip extension 102 can then be attached before the adhesive 116 cures, which provides a degree of positioning of the tip extension 102 due to the fact that the adhesive 116 is still in liquid or paste form. Alternatively, the adhesive 116 (with tape strips attached thereto) may be allowed to cure before placement of the add-on component. In either case, this particular embodiment also gives the advantage of a strong bond provided by the adhesive 116 in combination with the shear stress reduction provided by the tape strips 110.

Figure 5:
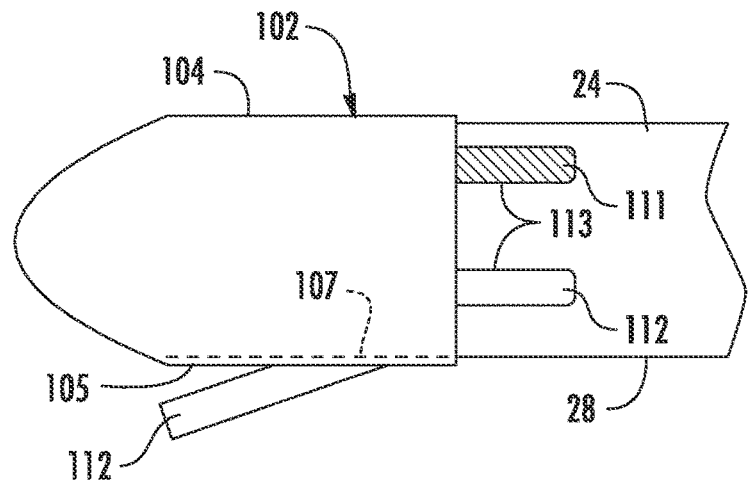
FIG. 5 illustrates a partial top view of the embodiment of FIG. 4 depicting the release liners being peeled from tape strips through the separated trailing edge of the tip extension.
Figure 6:
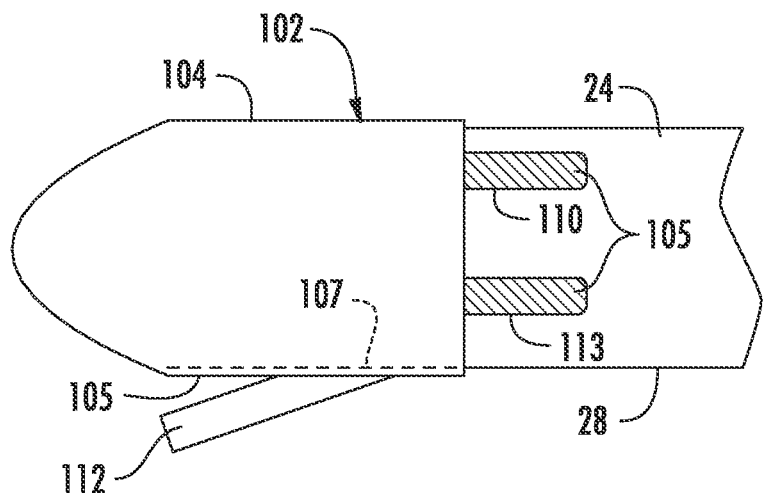
FIG. 6 illustrates a partial top view of the embodiment of FIG. 5 depicting the last release liner being peeled from tape strips through the separated trailing edge of the tip extension.
Figure 7:
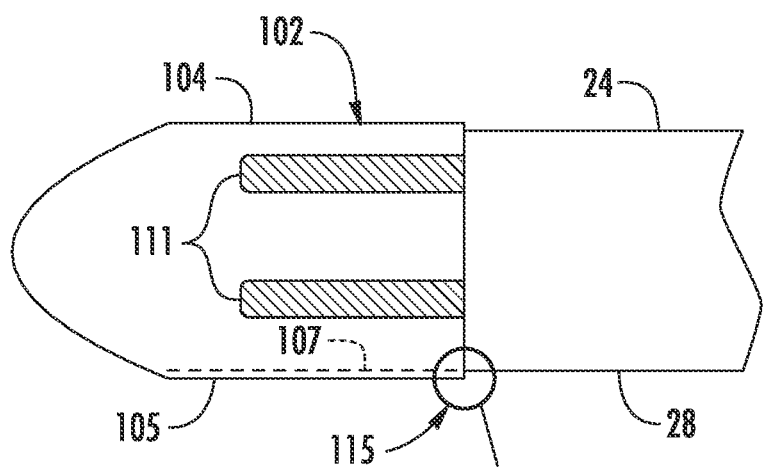
FIG. 7 illustrates a partial top view of the embodiment of FIG. 6 after final assembly of the tip extension on the wind turbine blade.

Referring particularly to FIG. 4, each of the tape strips 110 may have a length so as to define an extension tail 113 that extends span-wise beyond the span-wise end 103 of the tip extension 102. The length of the extension tails 113 may vary. For example, the strips 110 furthest from the trailing edge 106 may have a longer extension tail 113 to facilitate pulling the extension tail through the trailing edge 106, as compared to the tape strip 110 closest to the trailing edge 106. Alternatively, the extension tail 113 may encompass any other material or component that is attached to the tape strip, such as a wire, string, ribbon, and so forth. With the illustrated embodiment, because the extension tails 113 are comprised of the release liner 112 and underlying adhesive, as depicted in FIG. 4, after removal of the release liner 112, the remaining adhesive layer of the tape strips adhesive 111 remains, as depicted in FIG. 5, and may need to be trimmed.

Referring now to FIGS. 4-7, with the tip extension 102 held at the desired position on the blade tip 32, starting from the tape strip 110 furthest from the separated trailing edge 106, the extension tails 113 and release liners 112 of the respective tape strips are pulled through the separated trailing edge 106 and away from the tip extension 102 at an angle such that that entire release liner 112 is removed along the length of the tape strip 110 while maintaining position of the tip extension 102 against the blade surface 24 to attach the exposed adhesive 111 under the release liner 112 to either the surface 24 of the wind turbine blade or the interior surface of the add-on component (depending on initial placement of the tape strips 110 on the blade surface 24 or on the interior surface of the tip extension 102). After all of the release liners 112 have been removed in sequential order from furthest to closest to the separated trailing edge 106, the remaining adhesive layers 111 can be trimmed to provide the finished blade depicted in FIG. 7.

Referring to FIGS. 3-7, the suction side and pressure side edges 105, 107 of the separated trailing edge 106 extend past the trailing edge 28 of the wind turbine blade to provide a chord extension aspect to the tip extension 102. These edges can then be bonded together after attaching the tip extension 102 to the blade in the manner discussed above. The edges 105, 107 may extend an equal chord-wise distance past the blade trailing edge 28, or the edges 105, 107 may be offset in that one of the edges extends past the other. The dashed line indicating the pressure side surface edge 107 is meant to depict both of these configurations. Thus, the tip extension 102 is configured to define an extended trailing edge 117 of the rotor blade 16.

Figure 8:
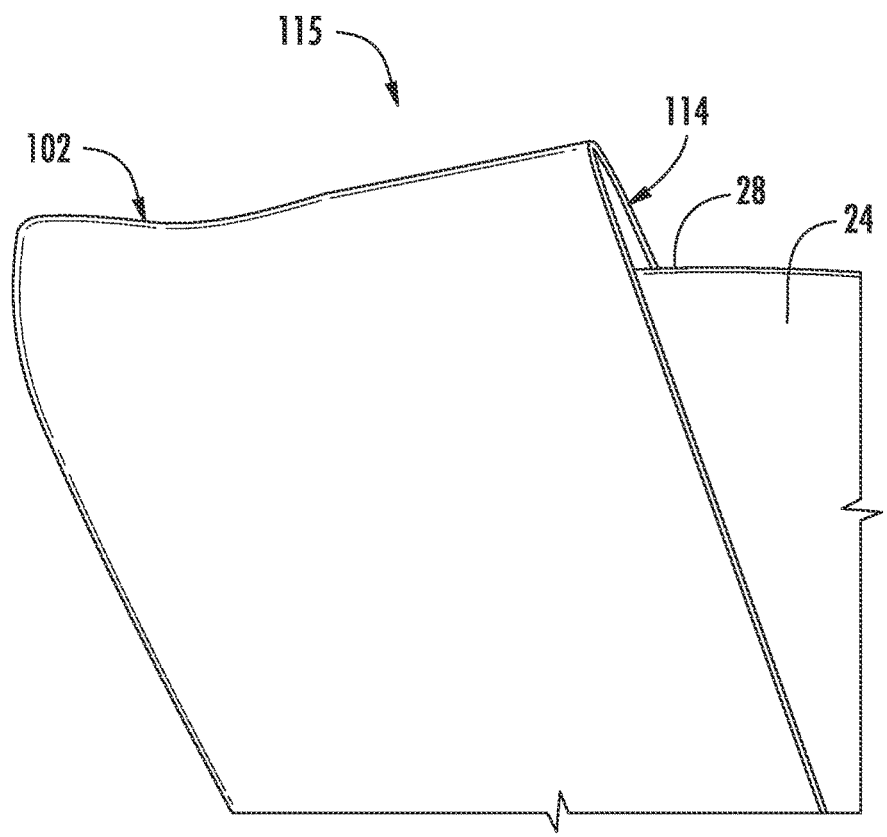
FIG. 8 illustrates a detailed, perspective view of the embodiment of FIG. 7.

Referring now to FIG. 8, with the tip extension 102 configurations as described herein, however, it may be further desired for noise purposes to minimize the step profile 114 at the transition region 115 from the blade trailing edge 28 and the tip extension trailing edge 106. This can be accomplished, for example, by providing at least one chord extension 108 adjacent to the edge 106 of the tip extension 108 so as to minimize noise caused by the step profile 114. For example, as shown generally in FIGS. 9-12, the chord extension(s) 108 defines an overall length extending from a first end 118 to a second end 119. In addition, the tip extension assembly 100 may include a plurality of chord extensions 108 aligned along the span 44 of the rotor blade 16 so as to define a continued extended trailing edge 117 thereof.

Figure 9:
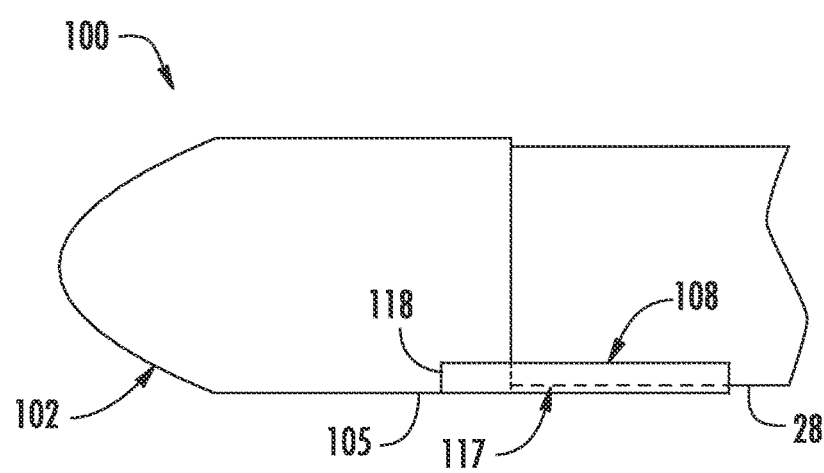
FIG. 9 illustrates a partial top view of the embodiment of FIG. 7 with a chord extension overlapping the tip extension according to the present disclosure.
Figure 10:
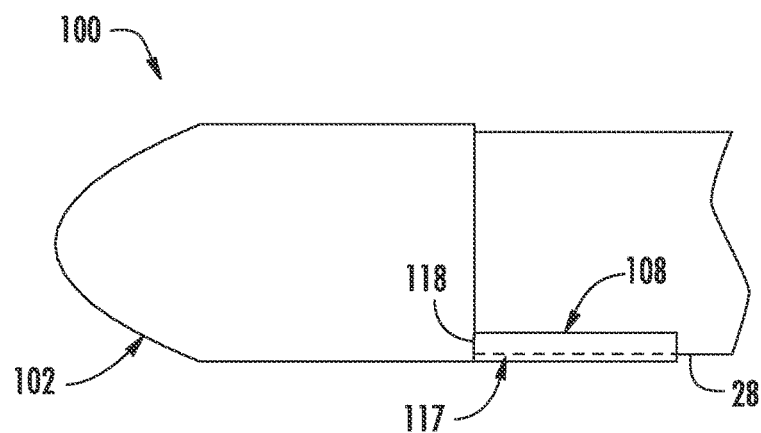
FIG. 10 illustrates a partial top view of the embodiment of FIG. 7 with a chord extension abutting the tip extension according to the present disclosure.
Figure 12:
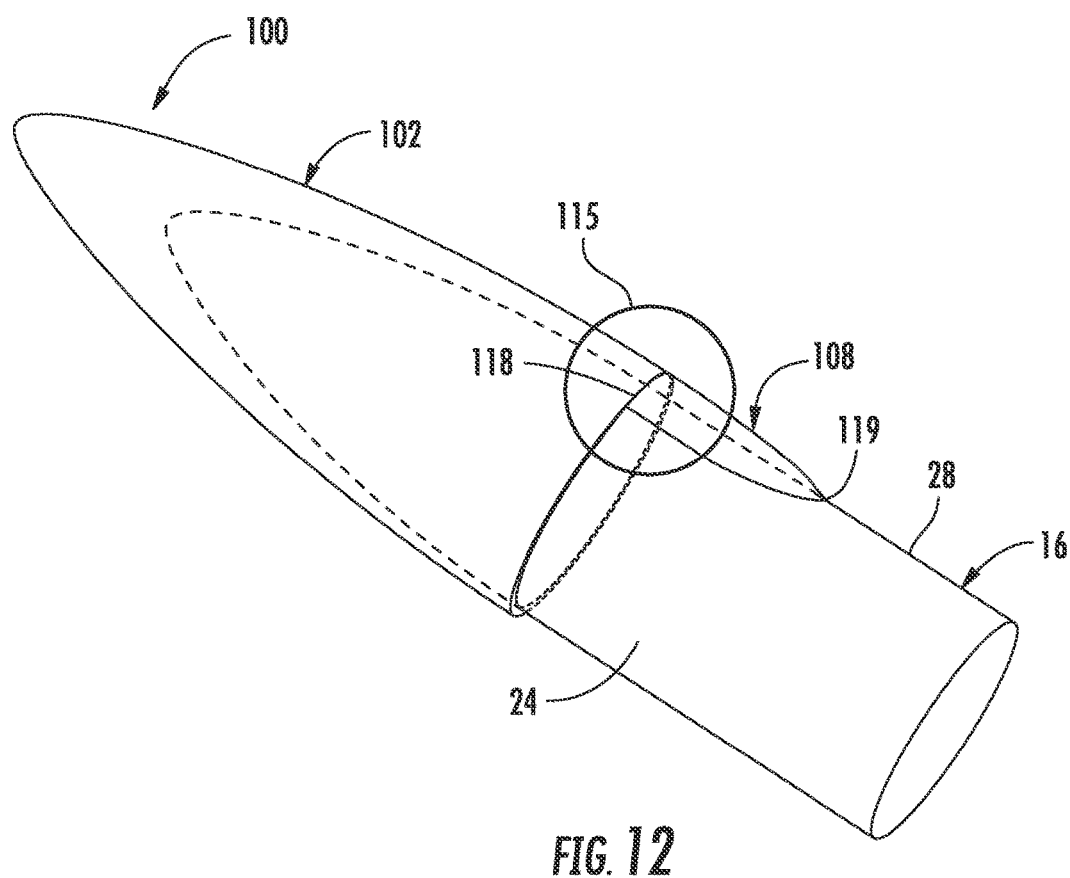
FIG. 12 illustrates a perspective view of another embodiment of a rotor blade according to the present disclosure, particularly illustrating a tip extension assembly configured with a blade tip of the rotor blade.

More specifically, as shown in FIGS. 9 and 10, the first end 118 of the chord extension 108 may contact the edge 106 of the tip extension 102 so as to provide a continued extended trailing edge 117 of the rotor blade 16. For example, as shown in FIG. 9, the first end 118 of the chord extension 108 may contact the edge 106 of the tip extension 102 by overlapping the edge 106 of the tip extension 102. Alternatively, as shown in FIG. 10, the first end 118 of the chord extension 108 may contact the edge 106 of the tip extension 102 by abutting against the edge 106 of the tip extension 102. In another embodiment, as shown in FIG. 12, the second end 119 of the chord extension 108 may taper towards an outer surface 24, e.g. the trailing edge 28, of the rotor blade 16 such that the second end 119 is substantially flush with the outer surface 24 of the rotor blade 16.

In addition, in certain embodiments, the second end 119 of the chord extension 108 may extend to an inboard location of the rotor blade 16. More specifically, in certain embodiments, the inboard location may extend up to about 30% of the span 44 from the blade tip 32, more preferably about 20% of the span 44 from the tip 32, still more preferably about 10% of the span 44 from the tip 32. Thus, the inboard location of the step profile is configured to minimize the noise generated by the step profile 114.

Figure 11:
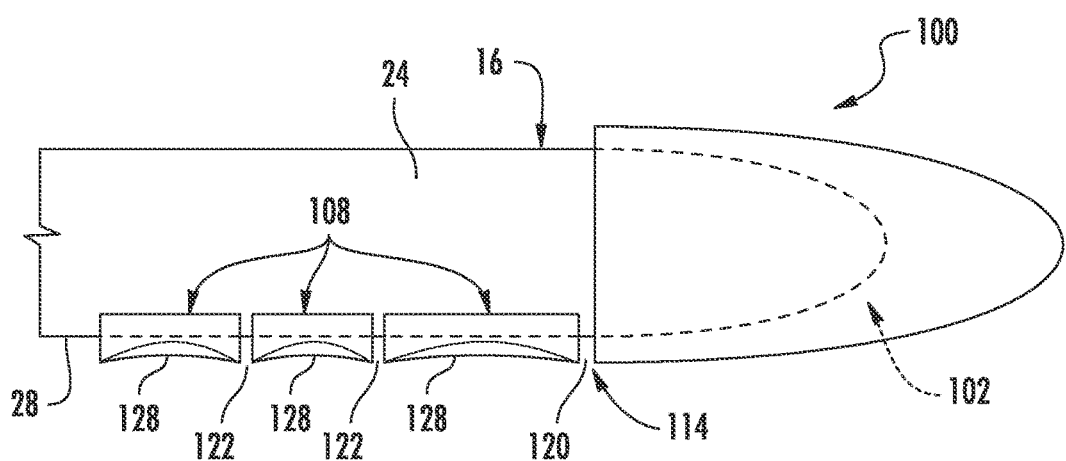
FIG. 11 illustrates a perspective view of one embodiment of a rotor blade according to the present disclosure, particularly illustrating a tip extension assembly configured with a blade tip of the rotor blade.

Referring now to FIG. 11, the chord extension 108 may be arranged with the tip extension 102 such that a gap 120 may exist between the first end 118 of the chord extension 108 and the edge 106 of the tip extension 102. In addition, in embodiments having a plurality of chord extensions 108 arranged along the span 44 of the rotor blade 16, each of the chord extensions 108 may be separated by a span-wise gap 122. In such embodiments, at least one of the chord extensions 108 may also include an aerodynamic feature 128, for example in the form a serrated edge. It should be appreciated that the aerodynamic feature 128 may be a serrated profile for purposes of illustration only, and that any design of aerodynamic feature 128 is within the scope and spirit of the invention.

In alternative embodiments, the plurality of chord extensions 108 may be arranged such that adjacent chord extensions 108 contact each other.

Figure 13:
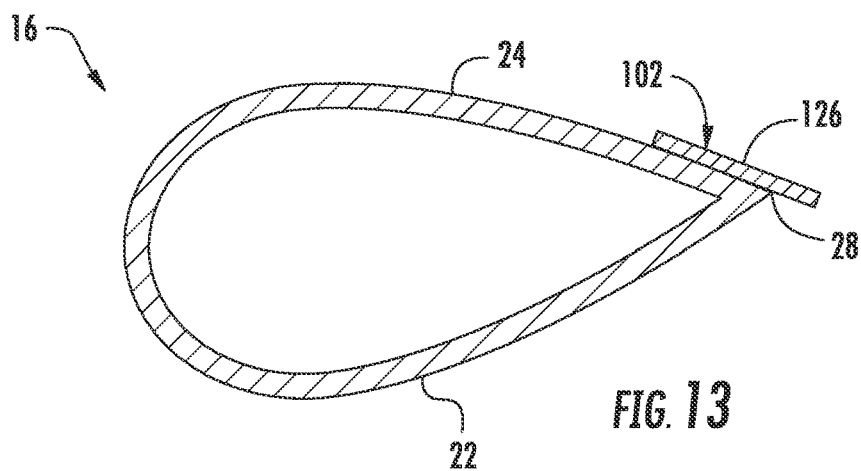
FIG. 13 illustrates a cross-sectional view of one embodiment of a rotor blade according to the present disclosure, particularly illustrating a chord extension having a pressure side surface secured to a pressure side of the rotor blade.
Figure 14:
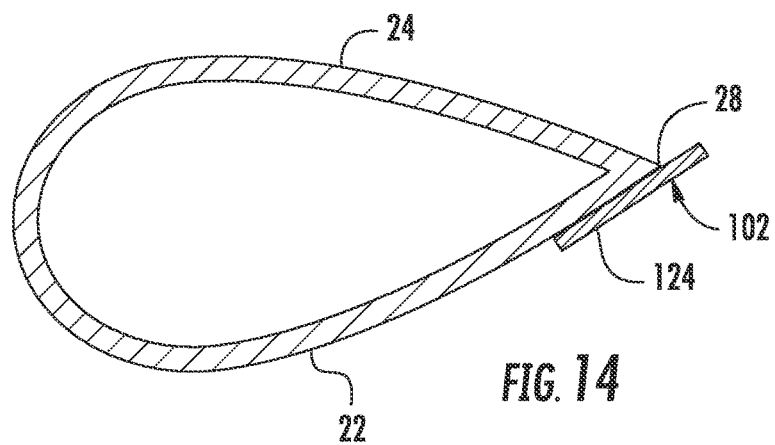
FIG. 14 illustrates a cross-sectional view of one embodiment of a rotor blade according to the present disclosure, particularly illustrating a chord extension having a suction side surface secured to a suction side of the rotor blade.
Figure 15:
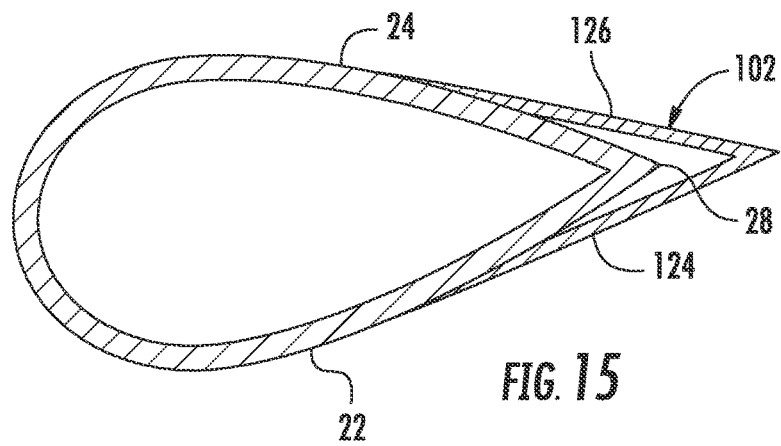
FIG. 15 illustrates a cross-sectional view of one embodiment of a rotor blade according to the present disclosure, particularly illustrating a chord extension having pressure and suction side surfaces secured to the pressure and suction sides of the rotor blade, respectively.

Referring now to FIGS. 13-15, the chord extension(s) 108 as described herein may include at least one of a pressure side surface 124 (FIG. 14), a suction side surface 126 (FIG. 13), or both (FIG. 15) attached the pressure and suction sides 22, 24 of the rotor blade 16, respectively. More specifically, as shown in FIG. 13, the chord extension 108 includes a pressure side surface 124 secured to the pressure side 22 of the rotor blade 16. Further, as shown in FIG. 14, the chord extension 108 includes a suction side surface 126 secured to the suction side 24 of the rotor blade 16. In yet another embodiment, as shown in FIG. 15, the chord extension 108 may include pressure and suction side surfaces 124, 126 attached the pressure and suction sides 22, 24 of the rotor blade 16, respectively.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A tip extension assembly for a rotor blade of a wind turbine, the tip extension assembly comprising:
a tip extension comprising a body having a pressure side surface and a suction side surface, the tip extension being slidable onto a tip of the rotor blade so as to overlap the rotor blade adjacent the tip, the tip extension defining an extended trailing edge of the rotor blade, wherein a root-side edge of the tip extension that faces a blade root of the rotor blade defines a step profile at a transition region between the tip extension and a trailing edge of the rotor blade; and,
a first chord extension comprising a root-side end facing the blade root and a tip-side end facing a blade tip of the rotor blade, the first chord extension configured for attachment to at least one of a pressure side or a suction side of the rotor blade, the tip-side end of the first chord extension spaced apart from the root-side edge of the tip extension in a span-wise direction to define a fixed span-wise gap between the tip-side end of the first chord extension and the root-side edge of the tip extension so as to minimize the step profile.

2. The tip extension assembly of claim 1, wherein the first chord extension tapers towards an outer surface of the rotor blade.

3. The tip extension assembly of claim 1, wherein the root-side end of the first chord extension extends to an inboard location of the rotor blade, wherein the inboard location minimizes noise generated by the step profile.

4. The tip extension assembly of claim 1, further comprising a plurality of additional chord extensions aligned along a span of the rotor blade.

5. The tip extension assembly of claim 4, further comprising a span-wise gap between each of the plurality of additional chord extensions.

6. The tip extension assembly of claim 4, wherein at least one of the first chord extension or one or more of the plurality of additional chord extensions comprises an aerodynamic feature.

7. The tip extension assembly of claim 6, wherein the aerodynamic feature comprises a serrated edge.

8. The tip extension assembly of claim 1, wherein the first chord extension comprises at least one of a pressure side surface or a suction side surface.

9. A rotor blade for a wind turbine, comprising:
a blade root, a blade tip, a pressure side, and a suction side, the pressure side and the suction side extending between a leading edge and a trailing edge; and,
a tip extension slid onto and overlapping the blade tip so as to define an extended trailing edge of the rotor blade, the tip extension comprising a body having a pressure side surface and a suction side surface, wherein a root-side edge of the tip extension that faces the blade root defines a step profile at a transition region between the tip extension and the trailing edge of the rotor blade; and, a first chord extension secured to at least one of the pressure side or the suction side of the rotor blade, the first chord extension comprising a root-side end facing the blade root and a tip-side end facing the blade tip, the first chord extension spaced apart from the root-side edge of the tip extension in a span-wise direction to define a fixed span-wise gap between the tip-side end of the first chord extension and the root-side edge of the tip extension so as to minimize the step profile.

10. The rotor blade of claim 9, wherein the first chord extension tapers towards an outer surface of the rotor blade.

11. The rotor blade of claim 9, further comprising a plurality of additional chord extensions aligned along a span of the rotor blade, wherein at least one of the first chord extension or one or more of the plurality of additional chord extensions comprises a serrated edge.

12. The rotor blade of claim 11, further comprising a span-wise gap between each of the plurality of additional chord extensions.

13. The rotor blade of claim 9, wherein the first chord extension comprises a pressure side surface and a suction side surface, the pressure side surface being secured to the pressure side of the rotor blade and the suction side surface being secured to the suction side of the rotor blade.

* * * * *